(12) United States Patent
Bruning et al.

(10) Patent No.: US 11,453,171 B2
(45) Date of Patent: Sep. 27, 2022

(54) METHOD OF APPARATUS FOR FORMING AN OBJECT BY MEANS OF ADDITIVE MANUFACTURING

(71) Applicant: Nederlandse Organisatie voor toegepast-natuurwetenschappelijk onderzoek TNO, The Hague (NL)

(72) Inventors: Fabien Bernard Jacques Bruning, Eindhoven (NL); Herman Hendrikus Maalderink, Nuenen (NL); Wijnand Christiaan Germs, Gorinchem (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/044,187

(22) PCT Filed: Apr. 9, 2019

(86) PCT No.: PCT/NL2019/050209
§ 371 (c)(1),
(2) Date: Sep. 30, 2020

(87) PCT Pub. No.: WO2019/199162
PCT Pub. Date: Oct. 17, 2019

(65) Prior Publication Data
US 2021/0362431 A1    Nov. 25, 2021

(30) Foreign Application Priority Data

Apr. 9, 2018 (EP) .................................... 18166297

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/124* (2017.08); *B33Y 10/00* (2014.12);
(Continued)

(58) Field of Classification Search
CPC ......... B33Y 10/00; B33Y 30/00; B33Y 50/02; B29C 64/393; B29C 64/124; B29C 64/268

See application file for complete search history.

(56) References Cited

U.S. PATENT DOCUMENTS 6,051,179 A    4/2000 Hagenau
9,073,374 B1    7/2015 Moore et al.
(Continued)

FOREIGN PATENT DOCUMENTS

CA    2890769 C    10/2017
CN    107030280 A    8/2017
(Continued)

OTHER PUBLICATIONS

European Patent Office, International Search Report in corresponding International Application No. PCT/NL2019/050209, dated Jul. 2, 2019 (2 pages).
(Continued)

*Primary Examiner* — Joseph S Del Sole
*Assistant Examiner* — Jamel M Nelson
(74) *Attorney, Agent, or Firm* — Leydig, Voit & Mayer, Ltd.

(57) ABSTRACT

A method of and an apparatus (1,29) for forming an object by means of additive manufacturing, the method comprising consecutively providing a plurality of layers (9) of building material (5, 6), and selectively curing one or more pixels (47) of each of the layers (9) during printing thereof. The method comprises a step of providing a first layer (9) of a first building material (5) onto a support surface (4, 30) or
(Continued)

a preceding layer (9), and selectively exposing, in accordance with layer data, one or more pixels (47) in the first layer (9) to a dose of radiation (45, 45'). It further comprises the identifying, based on the layer data, of one or more contour pixels (47) in the first layer (9) that coincide with a contour of a featured region of a subsequent second layer (9), wherein the featured region of the second layer (9) is to be provided using a second building material (6) different from the first building material (5). The method also comprises increasing, prior to said selectively exposing, a radiation dose (45') for the identified contour pixels (47). The step of selectively exposing includes exposing the one or more contour pixels (47) using the increased radiation dose (45').

7 Claims, 5 Drawing Sheets

(51) Int. Cl.
| | | |
|---|---|---|
| *B33Y 30/00* | (2015.01) | |
| *B33Y 50/02* | (2015.01) | |
| *B29C 64/124* | (2017.01) | |
| *B33Y 40/00* | (2020.01) | |
| *G01N 21/84* | (2006.01) | |
| *B33Y 80/00* | (2015.01) | |
| *B29C 64/268* | (2017.01) | |

(52) U.S. Cl.
CPC ............ *B33Y 30/00* (2014.12); *B33Y 40/00* (2014.12); *B33Y 50/02* (2014.12); *G01N 21/8422* (2013.01); *B29C 64/268* (2017.08); *B33Y 80/00* (2014.12)

(56) References Cited

U.S. PATENT DOCUMENTS

| | | |
|---|---|---|
| 9,416,001 B2 | 8/2016 | Berenschot et al. |
| 9,521,764 B2 | 12/2016 | Steiner |
| 9,533,451 B2 | 1/2017 | Folgar et al. |
| 9,559,349 B2 | 1/2017 | Braun et al. |
| 2015/0135530 A1 | 5/2015 | Belanger, Jr. |
| 2016/0311230 A1 | 10/2016 | Conrads et al. |
| 2016/0380634 A1 | 12/2016 | Ghanea-Hercock |
| 2017/0015065 A1 | 1/2017 | Potter et al. |
| 2017/0028622 A1 | 2/2017 | Westlind et al. |
| 2017/0056138 A1 | 3/2017 | Zandinejad et al. |
| 2017/0087639 A1 | 3/2017 | Folgar et al. |
| 2017/0106444 A1* | 4/2017 | Ishida .................. B23K 9/042 |

FOREIGN PATENT DOCUMENTS

| | | | |
|---|---|---|---|
| EP | 0266186 A2 | 5/1988 | |
| EP | 2052693 A1 | 4/2009 | |
| EP | 2052693 B1 * | 10/2013 | ......... A61C 13/0013 |
| EP | 3078493 A2 | 10/2016 | |
| EP | 3078493 A3 | 10/2016 | |
| JP | 5944330 B2 | 7/2016 | |
| WO | WO 2016/137722 A1 | 9/2016 | |
| WO | WO 2016/142147 A1 | 9/2016 | |
| WO | WO 2016/145182 A1 | 9/2016 | |
| WO | WO 2016/146374 A1 | 9/2016 | |
| WO | WO 2016/151586 A1 | 9/2016 | |
| WO | WO 2016/177627 A1 | 11/2016 | |
| WO | WO 2016/193119 A1 | 12/2016 | |
| WO | WO 2017/037713 A1 | 3/2017 | |

OTHER PUBLICATIONS

Chinese Patent Office, Office Action in corresponding Chinese Application No. 2019800238472 dated Mar. 11, 2022.

* cited by examiner

METHOD OF APPARATUS FOR FORMING AN OBJECT BY MEANS OF ADDITIVE MANUFACTURING

CROSS-REFERENCE TO RELATED APPLICATIONS

This patent application is a U.S. National Phase of PCT International Application No. PCT/NL2019/050209, filed Apr. 9, 2019, which claims priority to European Application No. 18166297.4 filed Apr. 9, 2018, which are both expressly incorporated by reference in their entireties, including any references contained therein.

FIELD OF THE INVENTION

The present document is directed at a method of forming an object by means of additive manufacturing, the method comprising consecutively providing a plurality of layers of building material, and selectively curing one or more pixels of each of the layers during printing thereof, the method comprising: providing a first layer of a first building material onto a support surface or a preceding layer; and selectively exposing, in accordance with layer data, one or more pixels in the first layer to a dose of radiation.

The document is further directed at an apparatus for forming an object by means of additive manufacturing, the apparatus comprising: a carrier providing a support surface for supporting the object to be formed; an applicator configured for consecutively providing a plurality of layers of building material onto the carrier; and a radiation source for selectively curing one or more pixels of each of the layers during application thereof; wherein the applicator is configured for providing a first layer of a first building material onto the support surface or onto a preceding layer of the object being formed; wherein the radiation source is configured for selectively exposing, in accordance with layer data, one or more pixels in the first layer to a dose of radiation.

Furthermore, the present document is directed at a use of an apparatus as defined above, at an object formed using a method as defined above, and at a computer program product.

BACKGROUND

The spreading of additive manufacturing processes, such as 3D printing, has gone very fast over the past decennium. The technology has found it's way into many different industrial and domestic fields of application, and is still under permanent development. One of the areas of development concerns the manufacturing of multi-material objects, wherein different materials are used to print a single object. The present document relates to making a multi-material 3D printed part with a structure of a second material embedded in the product.

A problem often encountered during the manufacturing of multi-material objects relates to the interaction between the different materials in their different phases or states of curing. This problem is for example explained using a specific case of embedding a conductive track in a polymer product made by stereolithography (SLA), digital light processing (DLP) or alike technologies, but the same applies to other materials that are applied to a product made of a resin.

When a track of a conductive material is applied (by extrusion, inkjet, laser induced forward transfer (LIFT), or other) on a SLA printed product, the wetting of the underlying surface may be such that the conductive material spreads over the surface to places it should not go. This basically makes it difficult to control the shape/geometry of the added material, resulting in a different geometry then desired, and in the case of conductive materials leads to short circuits with other conductive tracks. This happens especially because on top of the cured surface a thin "wet" layer of the polymer resin remains due to oxygen inhibition. This "wet" layer of resin, the oxygen inhibition layer, makes the wetting of the conductive paste too good.

In the case of a suspension, like a silver paste, the high wetting results in an increased dispersion of the metal particles in the uncured resin, even increasing the above mentioned problems.

SUMMARY OF THE INVENTION

It is an object of the present invention obviate the above-mentioned disadvantages and to provide an additive manufacturing method and apparatus, which allows to quickly and accurately form a multi-material object.

To this end, there is provided herewith a method of forming an object by means of additive manufacturing, the method comprising consecutively providing a plurality of layers of building material, and selectively curing one or more pixels of each of the layers during printing thereof, the method comprising: providing a first layer of a first building material onto a support surface or a preceding layer; selectively exposing, in accordance with layer data, one or more pixels in the first layer to a dose of radiation; characterized by: identifying, based on the layer data, one or more contour pixels in the first layer that coincide with a contour of a featured region of a subsequent second layer, the featured region of the second layer to be provided using a second building material different from the first building material; increasing, prior to said selectively exposing, a radiation dose for the identified contour pixels; and wherein the step of selectively exposing includes exposing the one or more contour pixels using the increased radiation dose.

The invention is based on the insight that the level of curing (i.e. how well the pixels are cured) of pixels can be increased to become more fully cured by using an increased radiation dose. This will, dependent on how well the pixels are cured (i.e. the level of curing), reduce or even remove the oxygen inhibition layer. Since it is the oxygen inhibition layer that causes the trouble experienced with wetting of the surface, a reduced or even absent oxygen inhibition layer will prevent the further spreading of the second building material across the surface of the layer underneath. This will thus allow the featured region to be printed accurately using the second building material.

Although the same effect could potentially also be achieved by fully curing of the whole surface of the first layer, to completely get rid of the oxygen inhibition layer; the inventors have realized that this is usually not desired either as it gives rise to other disadvantages. Fully curing of the first building material in those areas where, in the consecutive second layer, a next layer of first building material is to be applied is experienced to result in poorer adhesion. Hence in those areas (i.e. the areas outside the featured region), adhesion will be poor which in turn results in a weak spot: the layer may peel off or tear, or may be less shock proof. Hence, fully curing of the whole first layer results in an integrity problem. Moreover, the full curing may further result in a color difference, which is typically not desired.

Therefore, in accordance with the present invention, based on the layer data available to the system (e.g. from a memory or from a data signal received by it), one or more contour pixels in the first layer are determined. These contour pixels are identified such as to coincide with a contour of the featured region of the subsequent second layer. These contour pixels in the first layer (underneath the to be applied second layer) are exposed with an increased radiation dose such as to increase their level of curing or even to fully cure the contour pixels. Due to this, the oxygen inhibition layer will be significantly diminished or even absent on these pixels. When subsequently the second layer is printed, the spreading of the second building material will then be ceased by the cured contour pixels. Moreover, this also overcomes the disadvantages of fully curing the first layer.

In accordance with some embodiments, the method therefore further comprises providing a second layer of building material onto the first layer, wherein the second layer includes the featured region, wherein the featured region is provided by printing of the second building material in accordance with the layer data, and curing one or more pixels in the second layer. The material may be cured by simply drying the material (e.g. to the air or using an air or gas blower, in an oven or using a heater, or in another suitable manner). Also, preferably, the material may be cured by selective exposure to a suitable dose of radiation. It is to be noted that the dose of radiation required to achieve a desired level of curing may differ from one material to the other. Hence the radiation dose required by the second building material may be different from the standard radiation dose for the pixels of the first layer. Also other radiation characteristics may be different, such as the wavelength or the manner of applying (e.g. pulsed or continuous). However, the skilled person is considered to be able to determine the required radiation dose and radiation characteristics for each building material, for achieving a desired curing level.

The contour of the featured region and the identification of pixels in the first layer underneath the second layer that are to be selected as contour pixels, may be determined by a controller of an additive manufacturing apparatus. Various different methods may be applied for determining the one or more contour pixels. For example, in accordance with some embodiments, the contour of the featured region is at least one of: an outer contour, including pixels that are over at least 50% of their surface area located outside a boundary of the featured region, or pixels that are contiguous thereto and located outside the featured region; or an inner contour, including pixels that are over at least 50% of their surface area located inside a boundary of the featured region, or pixels that are contiguous thereto and located inside the featured region. The boundary of the featured region, and which pixels coincide therewith or are located partially or fully inside or outside it, may be determined on the basis of the layer data available to the additive manufacturing system.

In accordance with further embodiments of the invention, the method further comprises identifying, in addition to the one or more contour pixels, one or more fill-in pixels in the first layer that coincide with the featured region in the second layer; wherein the step of selectively exposing further includes exposing the one or more fill-in pixels using the increased radiation dose. The fill-in pixels are those pixels that are located within the contour, i.e. surrounded by the contour. In these embodiments, all the pixels underneath the featured region are exposed with the increased radiation dose for improving their wetting characteristics by diminishing or removing the oxygen inhibition layer. The second building material, when being printed on the supporting surface provided by the first layer, will not spread beyond the pixels being printed. In fact this achieves the same effect of improved printing accuracy of the second building material being printed on the first layer. The shape of the featured region may thus be more accurately printed.

In accordance with some embodiments, after at least one of the one or more pixels in the first layer has been selectively exposed to the dose of radiation, the method further comprises a step of measuring a thickness of an oxygen inhibition layer at a location of the at least one pixel. The controller of the system may use the measured thickness of the oxygen inhibition layer to determine more accurately how much the radiation dose is to be increased in order to achieve the desired level of curing that allows to accurately print the second building material on top of the first layer. Such measuring may be performed per pixel or as an average for the whole or part of the first layer.

In accordance with some of these embodiments, the measuring of said thickness of the oxygen inhibition layer is performed by impinging a radiation beam at the location of the at least one pixel and analyzing an interference pattern provided by the reflected fractions of the radiation beam. For example, a laser beam may be impinged to obtain an interference pattern caused by double refraction: once at the interface between the oxygen inhibition layer and the ambient air and once at the interface between the oxygen inhibition layer and the cured first building material of the first layer. Each interface will reflect a fraction of the radiation beam, and these refracted fractions can be received with an optical sensor to obtain an interference pattern from which the thickness of the oxygen inhibition layer can be accurately determined. The measuring can be done in an instant, without further curing the building material. Additionally or alternatively, a radiation wavelength may be applied to which the building material is less responsive and does not cure. As may be appreciated, in an embodiment the measuring of the thickness in this manner may also be performed during the step of selective exposure, using the radiation for curing the first building material.

In another embodiment, the measuring of said thickness of the oxygen inhibition layer is performed by measuring a height position of a surface of the first layer at the location of the at least one pixel, and comparing the measured height position with a reference height position. Such expected height positions may be obtained from a memory or may be provided to the system 'on the fly' by calculation or from a data signal received by the system.

In a second aspect of the invention, there is provided an apparatus for forming an object by means of additive manufacturing, the apparatus comprising: a carrier providing a support surface for supporting the object to be formed; an applicator configured for consecutively providing a plurality of layers of building material onto the carrier; and a radiation source for selectively curing one or more pixels of each of the layers during application thereof; wherein the applicator is configured for providing a first layer of a first building material onto the support surface or onto a preceding layer of the object being formed; wherein the radiation source is configured for selectively exposing, in accordance with layer data, one or more pixels in the first layer to a dose of radiation; characterized in that, the apparatus further comprises: a controller configured for identifying, based on the layer data, one or more contour pixels in the first layer that coincide with a contour of a featured region of a subsequent second layer, the featured region of the second layer to be provided using a second building material different from the first building material; wherein the controller is further configured for determining, prior to said selectively exposing, an increased radiation dose for the identified contour pixels; and wherein the radiation source is configured for, during said selectively exposing, exposing the one or more contour pixels using the increased radiation dose.

In a third aspect of the invention, there is provided object manufactured by means of a method according to the first aspect or by using an apparatus according to the second aspect, the object including at least a first layer comprising one or more pixels of cured first building material, wherein at least one or more contour pixels in the first layer that coincide with an outer or inner contour of a featured region of a subsequent second layer are cured using an increased radiation dose, the object further including a second layer, wherein the second layer includes the featured region, and wherein the featured region comprises the second building material.

In a fourth aspect of the invention, there is provided a computer program product suitable for being loaded into a memory of controller system of an additive manufacturing apparatus, wherein the computer program product is adapted to perform the method according to the second aspect for manufacturing an object in accordance with the third aspect by means of additive manufacturing.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
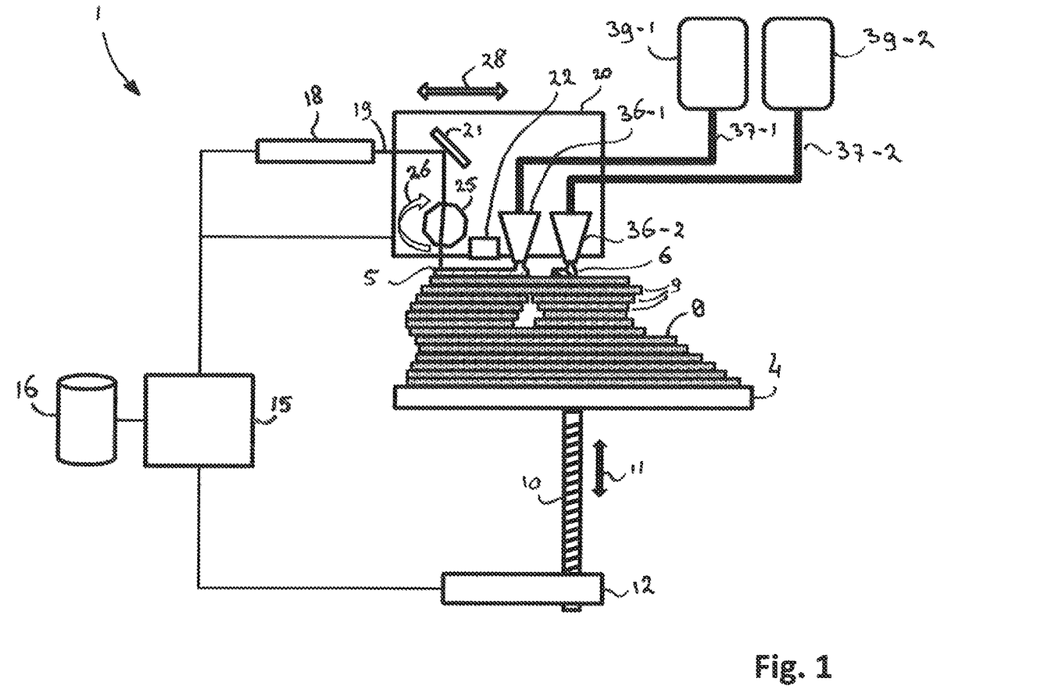
FIG. 1 schematically illustrates an apparatus in accordance with an embodiment of the present invention.

FIG. 1 schematically illustrates an apparatus 1 in accordance with an embodiment of the present invention for layerwise production of a multi-material tangible object 8. The apparatus 1 consists of translatable carrier platform 4 that can be moved in a vertical (z) direction up and down by means of an actuator 12 driving a rotatable axis 10. As may be appreciated, the up and down motion may also be achieved differently, e.g. hydraulically or by a different type of actuator. The direction (z) wherein the carrier platform 4 can be translated is indicated by double arrow 11.

In use, the tangible object 8 is produced on the carrier platform 4 layer by layer. To this end, a first building material 5 may be applied via a first applicator 36-1. An additional applicator 36-2 may optionally be present to apply a second building material 6. Furthermore, additional applicators of a same or similar type as applicators 36-1 and 36-2 (not present in the embodiments of FIG. 1) may be present to apply additional building materials if desired. The present description is not limited to a particular number of different building materials that can be applied.

The first and second building materials 5 and 6 may be liquids or powders which may be cured by applying a sufficient amount of energy to it. For example, the building materials 5 and 6 may comprise a resin that may be cured by illumination with optical radiation. In order to cure such a resin, sufficient amount of optical energy must be locally added to cure a voxel of the resin. This may for example be applied by means of an optical beam such as a laser beam of optical radiation of a suitable wavelength, intensity and/or duration. The total amount of energy, or radiation dose required to cure a voxel of the building material 5 or 6 is dependent on the type of building material and the volume of each voxel (i.e. the thickness of the layer times the surface area of each pixel). As may be appreciated, to apply a sufficient radiation dose for curing a voxel of building material 5 or 6, the duration of an optical pulse, the intensity of the laser beam, and/or the wavelength of the radiation may be varied typically.

The building materials 5 or 6 may comprise further building materials such as a metal or ceramic material in powder form, or a functional agent (e.g. a color agent). For example, the building material 5 or 6 may be a suspension of a resin or solvent and a further building material in powder form. Metal powder may for example be mixed with a resin homogeneously, and with a sufficient density of metal powder within the resin. This allows the layerwise production of metal objects by fusing, sintering or melting the metal powder within the resin, and removing the resin residue.

FIG. 1 only shows the carrier platform 4 upon which the layers making up the tangible object 8 are to be applied, including applicators 36-1 and 36-2, a sensor 22 and an exposure system (combined elements 18, 21, 25) on a carriage 20. Optionally, the platform 4 of FIG. 1 may be located inside a container (not shown) comprising the building material 5 wherein the object 8 is submerged. To produce the object 8 layer by layer, the carrier platform 4 is moved downward after the creation of each consecutive layer of the object 8.

After moving the platform 4 downward across the height of one layer, the applicators 36-1 and 36-2 selectively apply a next layer of fresh uncured building material 5 and 6 on top of the previously built layer of the object 8, thereby forming a liquid layer of building material having a uniform thickness. The applicators 36-1 and 36-2 receive the building materials 5 and 6 respectively via ducts 37-1 and 37-2 from building material reservoirs 39-1 and 39-2. For applying each material 5 and 6, layer data for each layer 9 is obtained by the controller 15 from memory 16. The layer data may be structured as a pixel array, specifying for each layer 9 where to provide the first building material 5 and where to provide the second building material 6. For example, the layer data may specify for each pixel thereof whether the first building material 5 or whether the second building material 6 (or optionally a further building material) must be applied, for forming each voxel of the layer 9. Controller may, dependent on this layer data, control the applicators 36-1 and 36-2 to provide either of the building materials 5 and 6.

As illustrated in FIG. 1, the apparatus 1 further comprises an exposure system comprising an optical radiation source 18 and optics 21 and 25 to allow selective exposure of the building material 5 and 6 for forming the layers of the object 8. The optical radiation source 18 in the apparatus 1 of FIG. 1 is a laser unit 18 providing a laser beam 19 to the exposure head on the carriage 20. The exposure head comprises a mirror 21 which reflects the laser beam 19 onto a rotatable polygon prism 25. The rotatable polygon prism 25 may for example be rotated in the direction indicated by arrow 26. Alternatively, instead of a polygon prism 25, a polygon mirror or a different scanner element may be applied for controllably reflecting the beam 19.

The carriage 20 is moved relative to the platform 4 (and/or the tangible object 8 thereon) in the direction indicated by double arrow 28. This allows to selectively apply the first and second building materials 5 and 6 on the previous layer 9 of the tangible object 8. By rotating the polycon prism 25, for example in the direction indicated by arrow 26, the optical beam 19 can be scanned in a desired direction across the surface of the object 8. The controller 15 controls the motion of the carriage 20 as well as operation of the applicators 36-1 and 36-2 to selectively apply the first building material 5 or the second building material 6. The controller 15 further controls the selective exposure of the uncured resin (5 or 6) to the optical radiation 19 to cure the building material selectively. For controlling the selective exposure thereof, the controller 15 uses the layer data obtained from memory 16 to identify which pixel is to be exposed with optical radiation for curing thereof.

The radiation dose required for curing the building material is dependent on the type of building material, the volume of the voxel (i.e. the size of each pixel as well as the thickness of the layer 9) and the level of curing desired. Typically, the radiation dose used for curing a building material in an additive manufacturing process is optimized to prevent later delamination of different layers and to prevent color differences. Each voxel is therefore typically not fully cured, but it is cured to a level that allows sufficient bonding with the next layer of building material. The data required for calculating the correct radiation dose per pixel may be obtained from the memory 16 of the system. Alternatively, the controller 15 may calculate the radiation dose on the fly using an algorithm provided to it.

As explained hereinabove, the incomplete curing of each voxel of for example building material 5 results in the presence of an oxygen inhibition layer 7 (not visible in FIG. 1) on top of the cured building material 5. This oxygen inhibition layer 7 causes the wetting properties of the surface of the top layer of building material 5 to be too good. The application of a second building material 6 onto an inhibition layer 7 would result in an undesired spreading of the building material 5 across the remainder of the surface of the object 8. To prevent this, in accordance with the present invention, some of the pixels in the layer underneath the present layer being applied are selectively cured to a higher level of curing to get rid of the oxygen inhibition layer 7. To be more precise, as will be explained further below, the controller 15 determines while curing the present layer, which pixels in the present layer coincide with a featured region in the next layer. The featured region in the next layer will be the region wherein the second building material 6 (or a further building material) will be applied in the next layer. Then, at least the pixels that coincide with the contour of the featured region are identified to be cured to a higher level curing. The dosed of radiation of these identified pixels is thereafter increased to obtain e.g. full curing and the increased radiation dose is selectively applied to these pixels such as to locally reduce or remove the oxygen inhibition layer 7. When the next layer is applied, spreading of the second building material 6 will not occur beyond these contours due to the absence of an oxygen inhibition layer on the fully cured pixels locally.

To determine the required radiation dose to be applied for each pixel, the controller 15 may receive sensor readings from sensor 22. Sensor 22 measures the thickness of the oxygen inhibition layer 7. The thickness of the oxygen inhibition layer is indicative of the level of curing of the building material and allows to accurately determine an increased radiation dose for obtaining full curing of a pixel (or curing to a level of curing or in the inhibition layer is insignificant). The sensor 22 may for example consist of a further laser beam from which an interference pattern is obtained which is indicative of the thickness of the oxygen inhibition layer 17.

Figure 2:
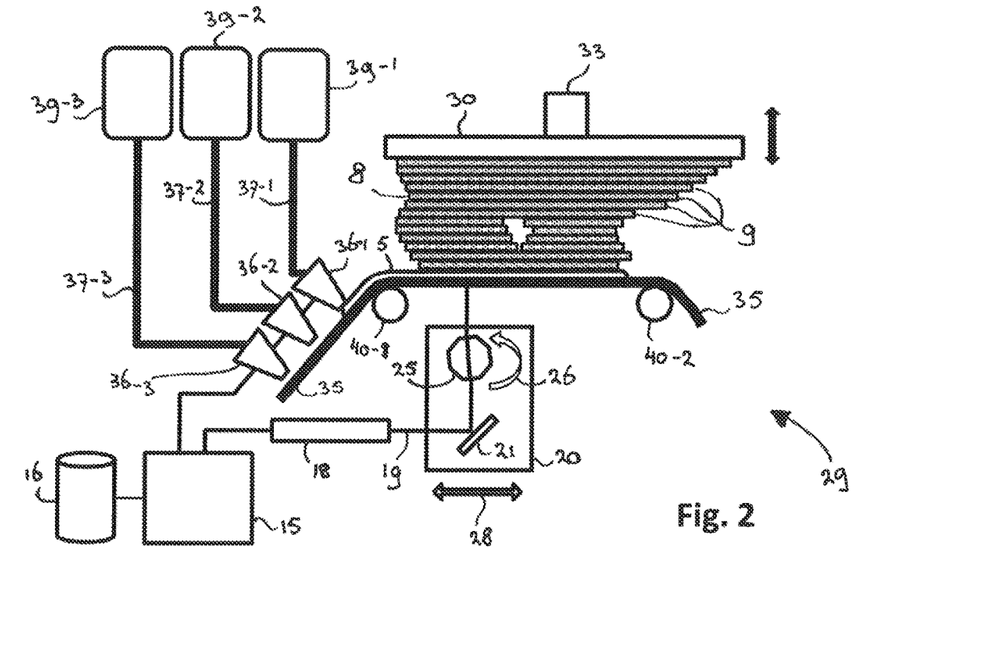
FIG. 2 schematically illustrates an alternative apparatus in accordance with an embodiment of the present invention.

FIG. 2 illustrates an alternative apparatus 29 for layerwise production of a tangible object 8. In the apparatus of FIG. 2, layers 9 of the tangible object 8 are attached to a movable carrier platform 30 from which the object 8 to be produced suspends during production. The carrier platform 30 can be moved up and down by means of an actuator 33. Applicators 36-1, 36-2 and 36-3 apply a layer containing the various building materials (e.g. first building material 5) to a flexible sheet 35 that can be moved underneath the tangible object 8 by means of rollers 40-1 and 40-2. The platform 30, during movement of the layer underneath the object 8, can be moved slightly upwards to prevent contact of the layer with the previous layer of the tangible object 8 during motion of the layer. The flexible sheet 35 may for example be transparent, or at least transparent to the radiation wavelength of the laser beam 19 provided by laser unit 18. Again, during selective exposure of the building material (e.g. first building material 5, second building material 6 or a third building material), the laser beam 19 is reflected by the mirror 21 through a rotatable polygon prism 25 or a similar solution using a mirror or other deflection means. By moving the carriage 20 including the exposure head in the directions indicated by arrow 28, a scanning motion across the surface of the layer to be produced allows selective exposure in accordance with a desired exposure pattern.

The three applicators 36-1, 36-2 and 36-3 illustrated in FIG. 2 are respectively connected, via ducts 37-1, 37-2 and 37-3 with three reservoirs 39-1, 39-2 and 39-3. Building material reservoir 39-1 contains the first building material 5. Building material reservoir 39-2 contains the second building material 6. Building material reservoir 39-3 contains the third building material. The applicators 36-1 through 36-3 are controlled by controller 15 to selectively apply the desired building material based on the layer data obtained from memory 16. The controller 15 also controls operation of the carriage 20, and the elements of the exposure head, e.g. optical source 18 and polygon prism 25.

Figure 3:
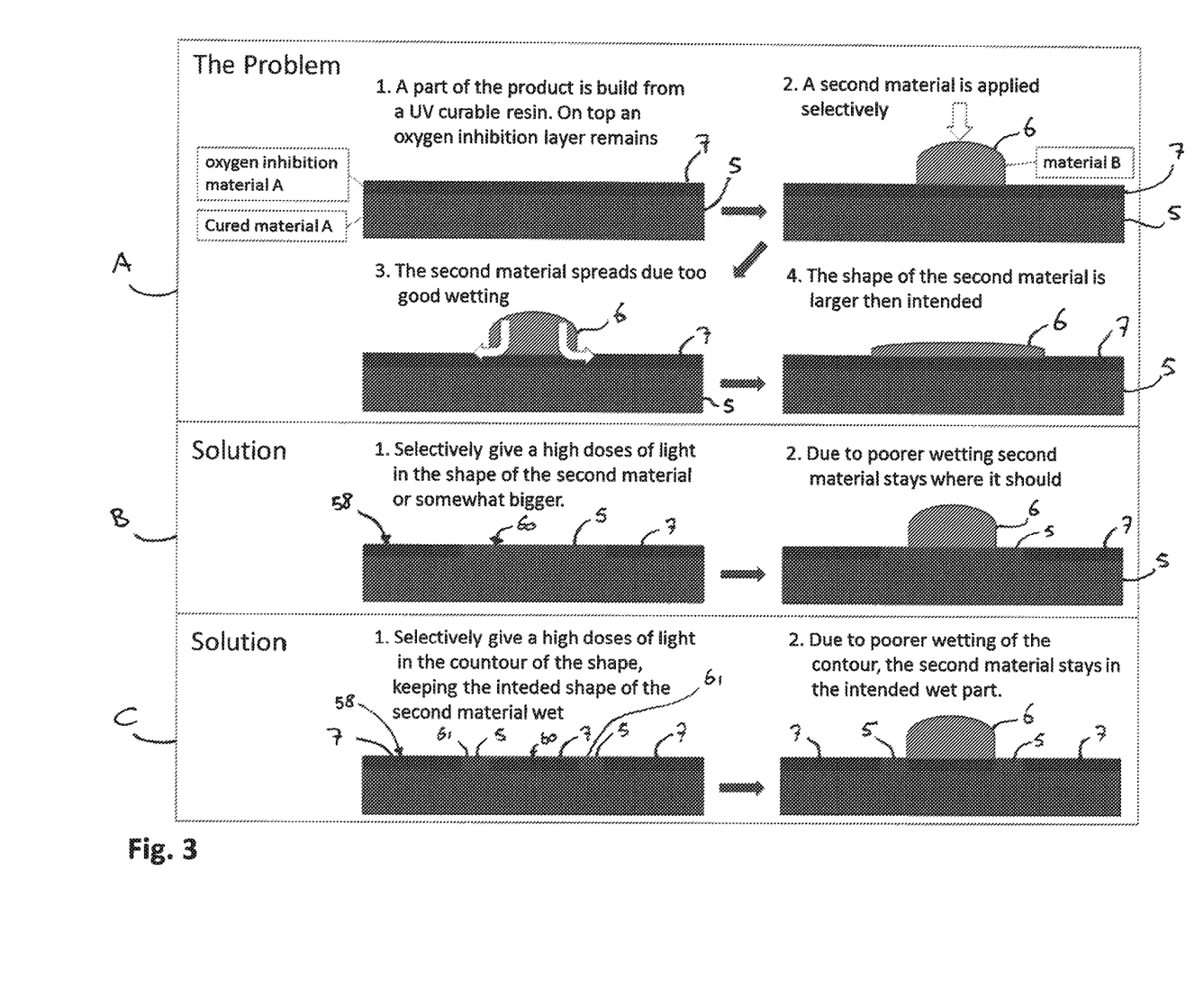
FIGS. 3A through 3C schematically illustrate the problem encountered when printing a second building material on top of a cured first building material including an oxygen inhibition layer, as well as various solutions provided by the present invention.

FIGS. 3A through 3C schematically illustrate the problem encountered when printing a second building material on top of a cured first building material including an oxygen inhibition layer, as well as various solutions provided by the present invention. In FIG. 3A, in step 1, a previously cured first layer is illustrated including a first building material 5 (material A) on top of which an oxygen inhibition layer 7 remains after curing. In the subsequent step 2, a second building material 6 (material B) is applied on top of the first layer. Due to the present oxygen inhibition layer 7, as illustrated in step 3, the second building material 6 will spread across the surface of the first layer. Therefore, in step 4 the shape of the second building material 6 is much larger than intended.

A solution illustrated in FIG. 3B, in accordance with the present invention, proposes to determine a region 60 on the surface 58 of the first layer that coincides with a featured region in the next (to be printed) second layer. In fact, in accordance with the solution of FIG. 3B, all the pixels that coincide with this featured region in the second layer are identified as being part of the region 60. The pixels making up the region 60 are cured with an increased radiation dose such as to fully cure the building material 5. The oxygen inhibition layer 7 will therefore be absent after curing of the region 60. The oxygen inhibition layer 7 will only be present on the remainder of the surface 58 that is cured using the normal calculated radiation dose for curing of building material 5. Then in step 2, due to the additional curing of the building material 5, the wetting will be locally less then in the oxygen inhibition layer 7, allowing the second building material 6 to be printed without spreading. The second building material 6 therefore stays where it is printed as illustrated in step 2 of FIG. 3B.

In fact, as illustrated in FIG. 3C, the solution of the present invention may be applied slightly different by determining only the contours 61 of the region 60 that coincides with the featured region in the subsequent second layer. Hence, as illustrated in FIG. 3C, the controller first determined the contours 61 of the region 60 that coincides with the featured region of the subsequent second layer. The controller identifies the pixels that make up the contour 61. This may be the outer contour of the region 60 (as illustrated in FIG. 3C), the inner contour of the region 60 or any pixel through which the boundary of the featured region crosses the pixel area. Once these pixels are determined, the pixels 61 making of the contours are cured with the increased radiation dose, such that the oxygen inhibition layer 7 will not be present in these contours 61. When the second building material 6 is applied onto the first building material 5, as illustrated in step 2 of FIG. 3C, due to the diminished wetting of the contour, the second building material 6 stays in the featured region (the region on top of the region 60 in the first layer).

Figure 4A:
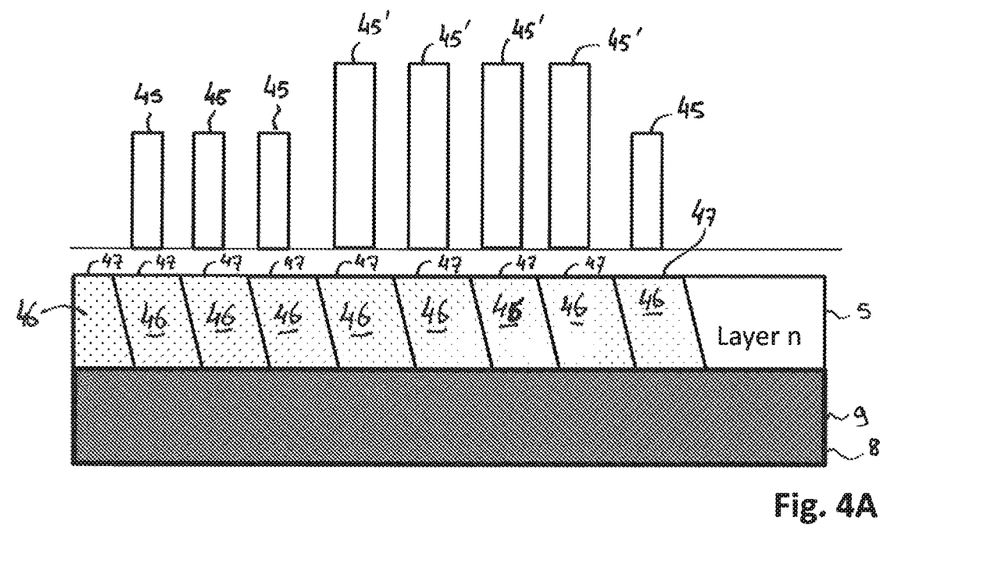
FIGS. 4A through 4C illustrate the various method steps in accordance with a first embodiment.
Figure 4B:
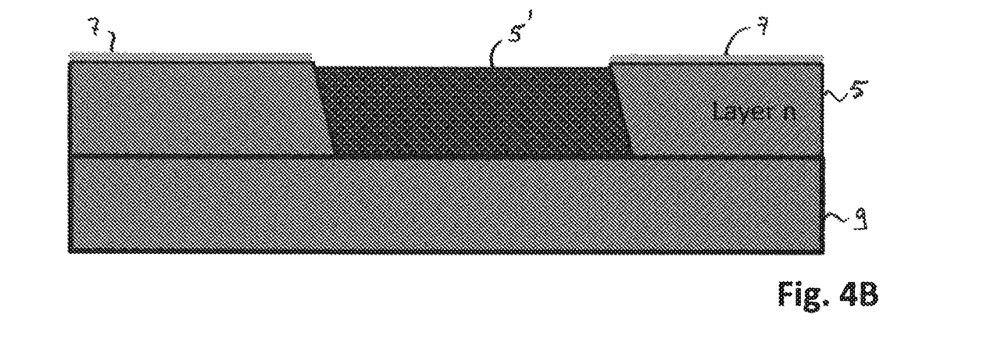
Figure 4C:
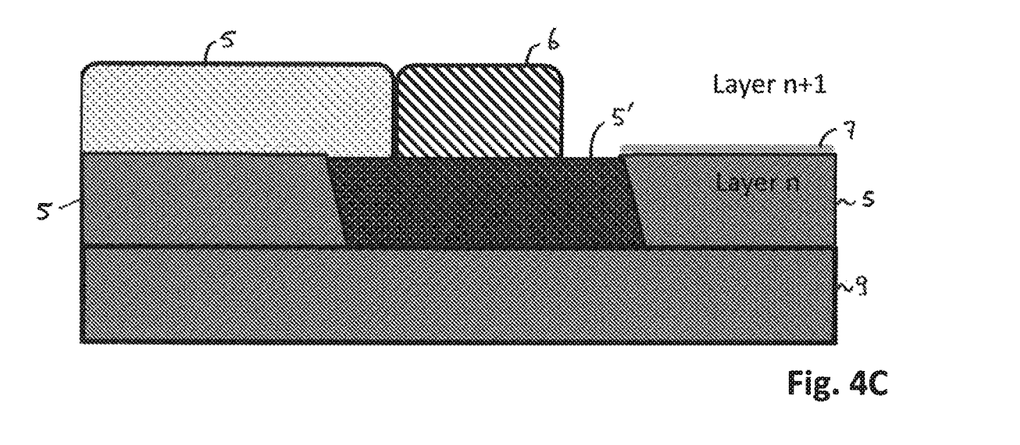

A step by step description is provided by means of FIGS. 4A through 4C. FIG. 4A illustrates the last cured layer 9 of the tangible object 8. A fresh layer n of the first building material 5 has been applied on top of the layer 9. The fresh layer n is roughly divided in voxels 45, the upper surfaces of which form pixels coinciding with the pixels of the layer data specified in the memory of the additive manufacturing system. The controller 15 determines for each pixel 47 the radiation dose required for curing the pixel 47 to the desired level of curing for that respective pixel. For example, such radiation dose may be specified with that layer data in the memory 16 of the controller. Alternatively, the radiation dose may be determined on the fly by the controller 15. As a further alternative, the system may apply a standard radiation dose per building material, optimized for the layer thickness, and may increase this standard radiation dose with a calculated or obtained amount for those pixels 47 that require an increased radiation dose to achieve a higher level of curing. In FIG. 4A, for each of the pixels 47, the radiation dose 45 and 45' has been indicated schematically by the bars above layer n. Some of the pixels 47 receive a lower radiation dose 45, while some other of the pixels 47 receive an increased radiation dose 45'.

In fact, the pixels receiving the higher radiation dose 45 are those pixels that coincide with the pixels forming the featured region in the subsequent second layer (layer n+1) wherein the second building material 6 is to be applied. This is illustrated in FIG. 4B. In FIG. 4B, the pixels 47 that have received a higher dose of radiation 45' are cured to a higher level and are indicated by reference numeral 5'. On these pixels, the oxygen inhibition layer 7 is absent. As a result, as is illustrated in FIG. 4C, when the layer n+1 is applied, the second building material 6 applied on top of the fully cured region 5' will not spread across the surface.

Figure 5A:
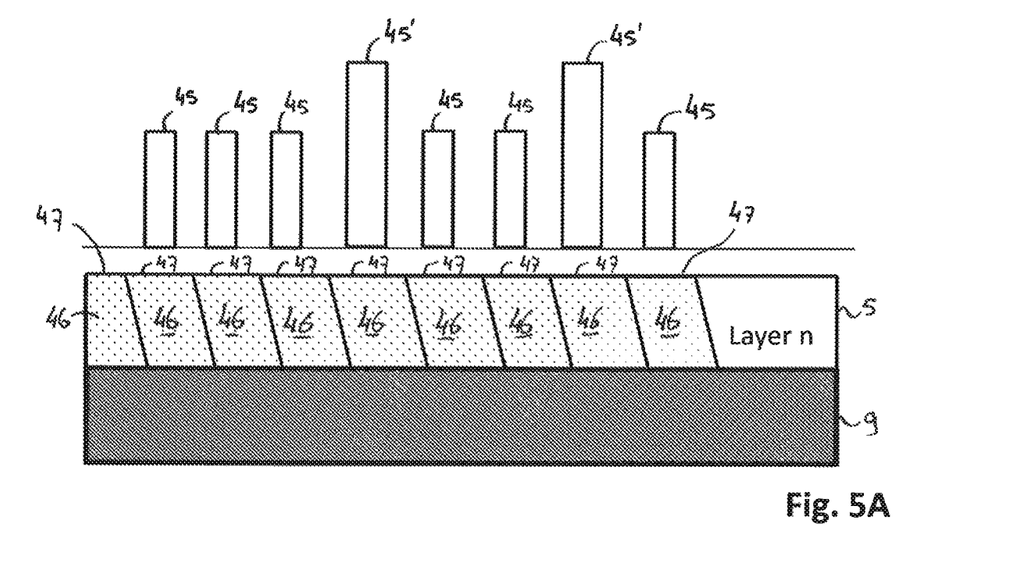
FIGS. 5A through 5C illustrate the various method steps in accordance with a second embodiment.
Figure 5B:
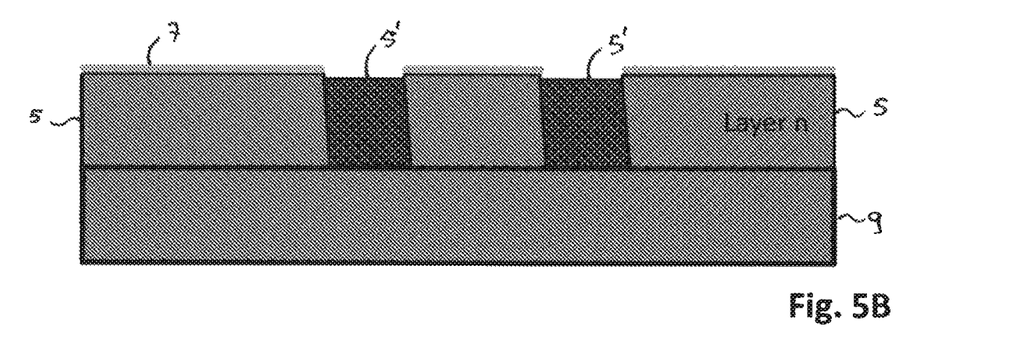
Figure 5C:
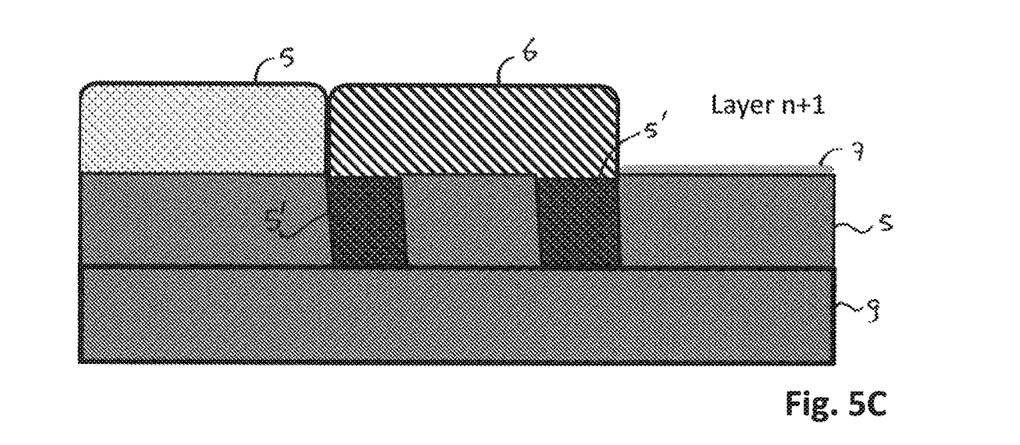

The same effect may be achieved by only exposing the contour pixels with the increased dose 45'. FIGS. 5A through 5C illustrate this alternative embodiment. Here, the pixels coinciding with the inner contour of the featured region are exposed to an increased radiation dose 45' (see FIG. 5A). As illustrated in FIG. 5B, only certain pixels that make up the contour of the featured region are fully cured and contain the fully cured building material 5'. The oxygen inhibition layer 7 will be present elsewhere on the surface of layer n. FIG. 5C illustrates the application of a fresh first building material 5 and a fresh second building material 6 in the layer n+1. As illustrated in FIG. 5C, the second building material 6 will not spread across the contour of the featured region.

Figure 6:
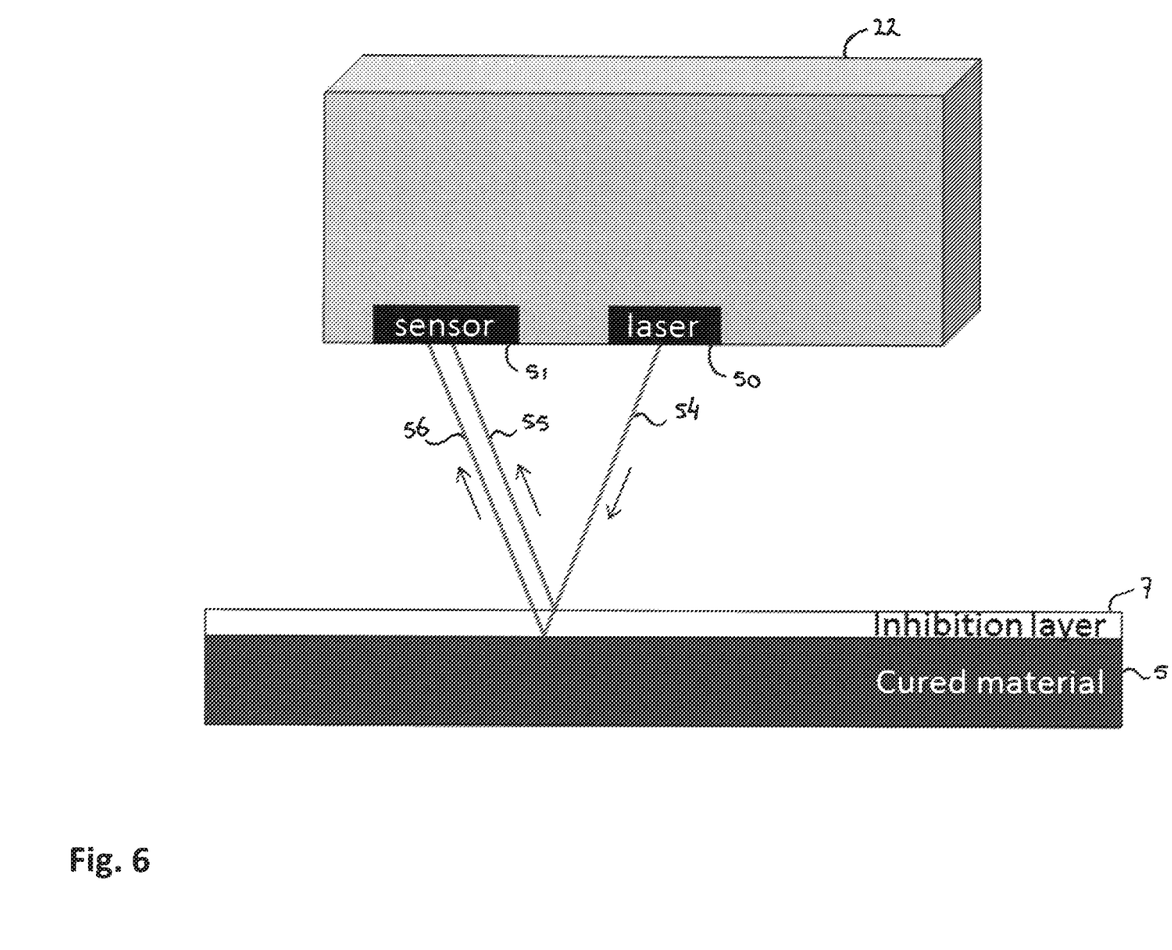
FIG. 6 schematically illustrates a sensor for sensing the thickness of the inhibition layer.

FIG. 6 schematically illustrates the sensor 22 for sensing the thickness of the inhibition layer. Measuring of the thickness of the oxygen inhibition layer on the cured material 5 allows to more accurately determine the increased radiation dose required for getting rid of the oxygen inhibition layer without overcuring of the material. To measure the oxygen inhibition layer 7, the sensor 22 comprises a laser 50 that provides a laser beam 54 which impinges onto the cured material 5. A first fraction 55 of the laser beam 54 will be reflected by the interface between the oxygen inhibition layer 7 and the ambient air. This first fraction 55 will be reflected towards the optical sensor 51. A second fraction 56 will be reflected by the interface between the oxygen inhibition layer and the cured material 5. Also this fraction 56 will be reflected towards the optical receiver 51. The most reflected fractions 55 and 56 will create an interference pattern on the surface of the optical receiver 51. Analysis of this interference pattern will allow to accurately determine the thickness of the oxygen inhibition layer 7. This information will be used to determine either the absolute radiation dose to be applied to the first building material 5 for fully curing it, or the additional radiation dose required in addition to the standard radiation dose for fully curing the first building material 5 to get rid of the oxygen inhibition layer.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A method of forming an object by additive manufacturing by consecutively providing a plurality of layers of building material, and selectively curing one or more pixels of each of the layers during printing thereof, the method comprising:
   providing a first layer of a first building material onto a support surface or a preceding layer;
   selectively exposing, in accordance with layer data, one or more pixels in the first layer to a dose of radiation;
   wherein the method further comprises:
      identifying, based on the layer data, one or more contour pixels in the first layer that coincide with a contour of a featured region of a subsequent second layer, the featured region of the second layer to be provided using a second building material different from the first building material; and
      increasing, prior to said selectively exposing, a radiation dose for the identified contour pixels,
      wherein the selectively exposing includes exposing the one or more contour pixels using the increased radiation dose.

2. The method according to claim 1, further comprising providing a second layer of building material onto the first layer, wherein the second layer includes the featured region, wherein the featured region is provided by printing of the second building material in accordance with the layer data, and
   curing one or more pixels in the second layer.

3. The method according to claim 1, wherein the contour of the featured region is at least one of:
   an outer contour, including pixels that are over at least 50% of their surface area located outside a boundary of the featured region, or pixels that are contiguous thereto and located outside the featured region; or
   an inner contour, including pixels that are over at least 50% of their surface area located inside a boundary of the featured region, or pixels that are contiguous thereto and located inside the featured region.

4. The method according to claim 1, further comprising identifying, in addition to the one or more contour pixels, one or more fill-in pixels in the first layer that coincide with the featured region in the second layer; and
   wherein the selectively exposing further includes exposing the one or more fill-in pixels using the increased radiation dose.

5. The method according to claim 1, wherein after at least one of the one or more pixels in the first layer has been selectively exposed to the dose of radiation, further comprising a measuring a thickness of an oxygen inhibition layer at a location of the at least one pixel.

6. The method according to claim 5, wherein the measuring of said thickness of the oxygen inhibition layer is performed by impinging a radiation beam at the location of the at least one pixel and analyzing an interference pattern provided by the reflected fractions of the radiation beam.

7. The method according to claim 5, wherein the measuring of said thickness of the oxygen inhibition layer is performed by measuring a height position of a surface of the first layer at the location of the at least one pixel, and comparing the measured height position with a reference height position.

* * * * *